United States Patent [19]
Hall et al.

[11] Patent Number: 5,737,626
[45] Date of Patent: Apr. 7, 1998

[54] DETERMINISTIC COMMUNICATION NETWORK FOR INDUSTRIAL CONTROL

[75] Inventors: Kenwood H. Hall, Stow; David A. Vasko, Macedonia; Edward Korsberg, Solon; Michael S. Pelley, Cleveland, all of Ohio

[73] Assignee: Allen-Bradley Company, Inc., Milwaukee, Wis.

[21] Appl. No.: 616,999

[22] Filed: Mar. 14, 1996

Related U.S. Application Data

[63] Continuation of Ser. No. 212,533, Mar. 14, 1994, abandoned.

[51] Int. Cl.⁶ .............................. G06F 13/00; G06F 13/14
[52] U.S. Cl. .............................. 395/800.01; 364/241.7; 364/242; 364/242.5; 364/284; 364/284.3; 364/940; 364/941; 364/949.91
[58] Field of Search .............................. 395/800.01; 364/941, 364/949.91, 241.7, 242, 242.5, 284, 284.3, 940

[56] References Cited

U.S. PATENT DOCUMENTS

| | | | |
|---|---|---|---|
| 4,396,983 | 8/1983 | Segarra et al. | 364/200 |
| 4,516,239 | 5/1985 | Maxemchuk | 370/85 |
| 4,766,534 | 8/1988 | De Benedictis | 364/200 |
| 4,799,215 | 1/1989 | Suzuki | 370/60 |
| 4,979,165 | 12/1990 | Dighe et al. | 370/60 |
| 4,991,172 | 2/1991 | Cidon et al. | 370/94.1 |
| 5,042,032 | 8/1991 | Dighe et al. | 370/94.1 |
| 5,249,184 | 9/1993 | Woest et al. | 370/858 |
| 5,291,481 | 3/1994 | Doshi et al. | 370/60 |
| 5,335,164 | 8/1994 | Gough, Jr. et al. | 364/149 |
| 5,391,970 | 2/1995 | Chaffee et al. | 318/618 |
| 5,463,296 | 10/1995 | Fugere et al. | 318/568.2 |

Primary Examiner—Gopal C. Ray
Assistant Examiner—Valerie Darbe
Attorney, Agent, or Firm—Keith M. Baxter; John M. Miller; John J. Horn

[57] ABSTRACT

A communication network for an industrial control system permits multiple masters and complex network topologies by transmitting data as packets through paths of nodes on the networks. The packets containing data are preceded by an OPEN message which pre-configured each node with the necessary information to process the stream of succeeding packets in an efficient manner and thus to reduce the necessary overhead in the transmission of each data packet. Each node receiving the OPEN message evaluates its resources and if those resources are insufficient to reliably handle the indicated packets, a message is returned to the originating node indicating that a connection cannot be formed.

1 Claim, 4 Drawing Sheets

| CID | BUFFER RANGE | RETRANS. CID | |
|---|---|---|---|
| A | $X_1 - X_2$ | A' | |
| B | $X_2 - X_3$ | B' | |
| C | $X_3 - X_4$ | C' | |
| D | $X_4 - X_5$ | D' | |

| | TYPE | TIME OUT | BUFF. SIZE | PRIORITY | RATE | CID | PATH |
|---|---|---|---|---|---|---|---|
| | 50 | 48 | 46 | 44 | 42 | 40 | 38 |

| | CIP | DATA |
|---|---|---|
| | 40 | 54 |

DETERMINISTIC COMMUNICATION NETWORK FOR INDUSTRIAL CONTROL

This is a continuation of Ser. No. 08/212,533 filed on Mar. 14, 1994 now abandoned.

FIELD OF THE INVENTION

This invention relates to industrial control systems and, in particular, to a communication network for the components of industrial control network that can provide real-time, deterministic operation.

BACKGROUND ART

Programmable controllers are specialized computers used for controlling an industrial process, such as an assembly line, and in accordance with a stored program. Under the direction of the stored program, the programmable controller examines a series of inputs, reflecting the status of the industrial process, and changes a series of outputs, controlling the industrial process. The inputs and outputs are most simply binary, that is on or off, however analog inputs and outputs are normally also available.

Programmable controllers are frequently programmed in a "relay ladder" language in which instructions are represented graphically by "contacts" and "coils" of virtual relays connected and arranged in ladder-like "rungs". This language reflects the emphasis of industrial control on the processing of inputs, represented by the contacts, and outputs, represented by the coils. Often, even in complex industrial control situations, updating inputs and outputs can dominate the control process, the control program itself, which determines the values of the outputs from the inputs being composed of relatively simple logical operations.

The traditional relay language also reflects a preoccupation of the designer of industrial controls with real-time control. That is, the ideal industrial controller should behave as if there were multiple relays wired to various inputs and outputs operating in parallel to change an output on an essentially instantaneous basis in response to changing inputs.

Present industrial controllers do not, in fact, employ separate parallel relay-like structures but instead simulate the parallel operation of the relays by means of a conventional Von-Neumann type computer processors which executes instructions one at a time, sequentially. The practical appearance of parallel operation is obtained by employing extremely fast processors in the execution of the sequential control program.

Equally important as real-time operation in industrial control systems, is the secondary requirement that the operation of the industrial control system be deterministic. This requirement generally means that the industrial system must process its inputs and outputs in a manner so that a given sequence of input changes, at given times, predictably produces the desired series of output changes.

This determinism requires that the amount of time needed to read inputs and write changes to the appropriate outputs should be not only short but constant, i.e., not subject to significant variation or jitter. Relatively small variations in reading or writing time can, in a high speed system, change the apparent order of the changes in inputs and outputs to often disastrous consequences. Accordingly, signals indicating changes in inputs or outputs must not be delayed or advanced by significant or unpredictable amounts, and of course, must not be lost entirely.

Industrial controllers differ from conventional computing systems also in that the various components of the industrial control system are typically separated by a considerable distance commensurate with the expanse of a large factory or manufacturing operation. Time critical inputs from the factory and outputs to controlled machinery may be located remotely from the central processor.

In order to avoid the introduction of unnecessary delay in the processing of inputs or outputs, the inputs and outputs are typically linked to the central processor executing the control program by means of a shared, high speed data link so that messages from multiple input and output (I/O) points may be transmitted rapidly with minimal wiring.

Normally such data links currently operate on a master-slave basis with the central processor operating as a single master controlling the timing and order and the data transmission. This single master, multiple slave relationship is in keeping with the need for deterministic operation. The central processor, as master, can control the priority and transmission rate of data to ensure prompt updating of remote I/O as required. The single master architecture also provides a communication system imposing relatively little overhead in the transmission of data, that is, relatively little time is spent on tasks such as arbitration between competing users of the data lines and various other matters of communication protocol, that is not directly devoted to the transmission of data.

The single master, multiple slave architecture does however have significant limitations, one of which is that the single master imposes an effective bottleneck in managing the inputs and outputs. If significant processing is to be done by auxiliary processors outside of the central processor to alleviate this problem, the inputs and outputs controlled by the auxiliary processors must be isolated from the main processor to prevent a conflict between what would be multiple masters on a single master data link. Communication between the central processor and inputs and outputs controlled by an auxiliary processor is unacceptably slowed by the requirement that such data transfer be initiated by the central processor. For similar reasons, the current single master architecture is not well adapted to industrial control systems that have multiple communication links, possibly with different timings and protocols, joining the various pieces of the control system.

Thus, there is a need for a new type of communication network for industrial control systems that readily adapts to the use of multiple masters and one that permits multiple communication links and yet that retains the real-time, deterministic characteristics necessary to industrial control.

SUMMARY OF THE INVENTION

The present invention provides a communication network for an industrial control system transmitting messages broken into packets of data, each packet carrying with it the necessary information to route the packet through various data links without direct control of the transmission by a single master. In order to provide the necessary high speed of data transmission, the various nodes through which the packets of the message are transmitted, are pre-configured by an "open" message. Subsequent packets in the message essentially carry only data. Importantly, in instances when packets cannot be transferred by a given node, a failure indication is returned to the source of the message, thus avoiding the possibility that packets will be lost.

Specifically, in the process of a first node sending a message to a second node, both possibly being part of a longer path, the first node generates a connection identifier identifying a message to be transmitted to the receiving node. The first node then sends an OPEN message to the receiving node including the connection identifier and transmission information related to transmission requirements of the message. The connection identifier is stored in a table in the receiving node as indexed by the connection identifier and the receiving node prepares for the processing of the message according to the transmission information. The first node then sends a data message from the first node to the receiving node, the data message having a data part and the connection identifier. At the receiving node, the connection identifier of the data message is matched to the connection identifier of the table of the receiving node. The data message is processed at the receiving node according to the transmission information indexed by the connection identifier. The transmission information, may be for example, how much buffer memory is needed for temporary storage of the message, or in the case of a scheduled message, what schedule is desired.

Thus, it is one object of the invention to provide an extremely flexible communication network that is adaptable to operating on multiple links connected by bridges and the like but that provides real-time deterministic operation as required by an industrial control system. The use of an OPEN message, allowing pre-configuration of the intermediate nodes in the message's path, allows higher speed data transmission by eliminating the need for each packet of the message to carry full routing information.

If the preparation for the processing of the message according to the transmission information by the receiving node is unsuccessful, the receiving node returns a connection failure message to the first node.

It is thus another object of the invention to reduce the possibility that packets thought to have been successfully transmitted will, in fact, be lost because of the limitations of an intermediate node.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

BRIEF DESCRIPTION OF THE DRAWINGS

FIG. 3 is a connection table, employed by the microprocessor of FIG. 2 as held in the memory of FIG. 2 and used for pre-configuring the node per the present invention;

FIG. 4 is a simplified diagram of an OPEN message transmitted on the links of FIG. 1 and used to pre-configure nodes of FIG. 2 for transmission of message data;

FIG. 5 is a diagram similar to FIG. 4 of the message data transmitted once the configuration of nodes has been made;

DETAILED DESCRIPTION OF THE PREFERRED EMBODIMENT

Figure 1:
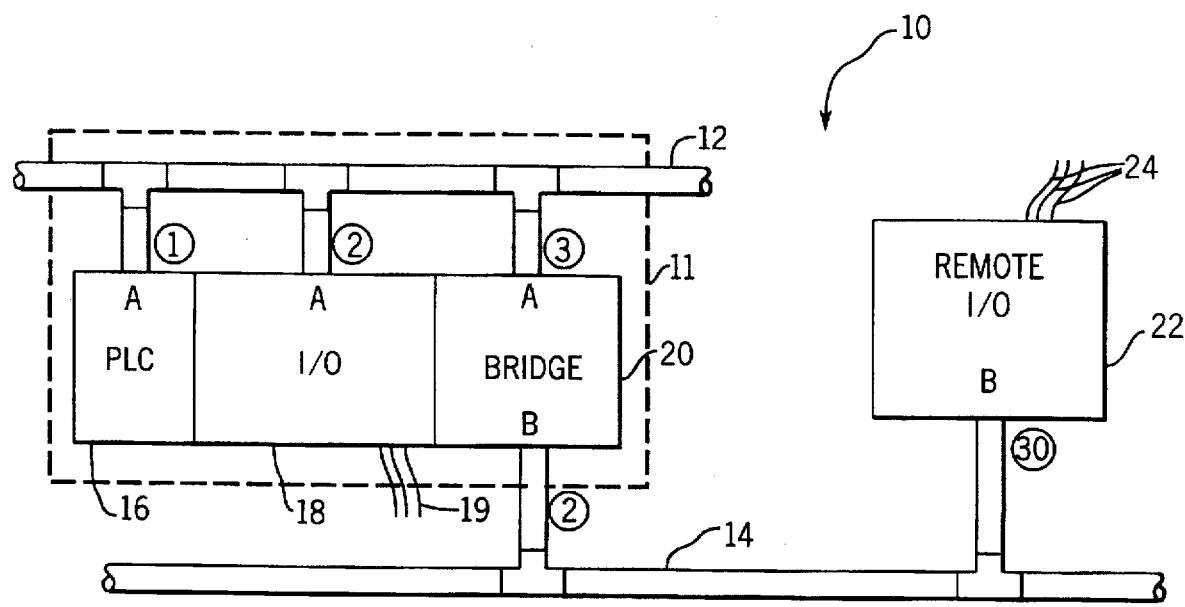
FIG. 1 is a schematic view of a simple multiple node industrial control system showing a central programmable logic controller (PLC) and local I/O attached to a first network and a bridge between a first and second link, the latter which connects to the remote I/O.

Referring to FIG. 1, a communication network 10 of the present invention includes a backplane communication link 12 and a remote communication link 14. The backplane communication link 12 may, for example, be a physical backplane in a cabinet 11 containing various elements of an industrial controller. Alternatively or in addition, the backplane communications link 12 may be an external, shared communication link.

Attached to the backplane communication link 12 by means of its port A is a programmable logic controller (PLC) 16, executing a stored program providing for the control of the industrial process. The stored program of the PLC 16 also directs the connection of the PLC 16 to other devices on the links 12 and 14 and for this purpose holds information describing the connection of such other devices to the links 12 and 14 as will be discussed in detail below.

Also attached to the backplane communication link 12 via its port A is a local input/output (I/O) unit 18 providing connection points to inputs and outputs attached to the industrial process by means of lines 19. The inputs and outputs to I/O 18 may be read and written to by the PLC 16 through link 12 in the execution of its stored program.

A bridge 20 connects to the backplane communications link 12 via its port A and also to the remote communication link 14 by its port B. The bridge 20 thus serves as a pathway for data between the backplane communication link 12 and the remote common link 14. Also connected to remote link 14 (by its port B) is a remote I/O rack 22 providing tie points for inputs and outputs spatially separated from the cabinet 11 and connected to various components of the controlled equipment by I/O lines 24.

Each of the PLC 16, local I/O 18, bridge 20 and remote I/O 22 are termed nodes and may communicate messages among themselves via links 12 and 14 as will be described. The designations of port A and B are largely arbitrary and serve merely to distinguish between ports in a multiple port node. Each port on a given link 12 or 14 has a link address, shown circled in FIG. 1, serving together with the ports to further define the connections of the nodes to the links 12 and 14. The link addresses of port A of the PLC 16, local I/O 18, and bridge 20 are 1, 2 and 3 respectively. The link addresses of port B of the bridge 20 and remote I/O 22 are 2 and 30 respectively. In general, a communication system employing the present invention can have additional common links and nodes. A combination link addresses and ports uniquely defines a connection path through the network 10.

Figure 2:
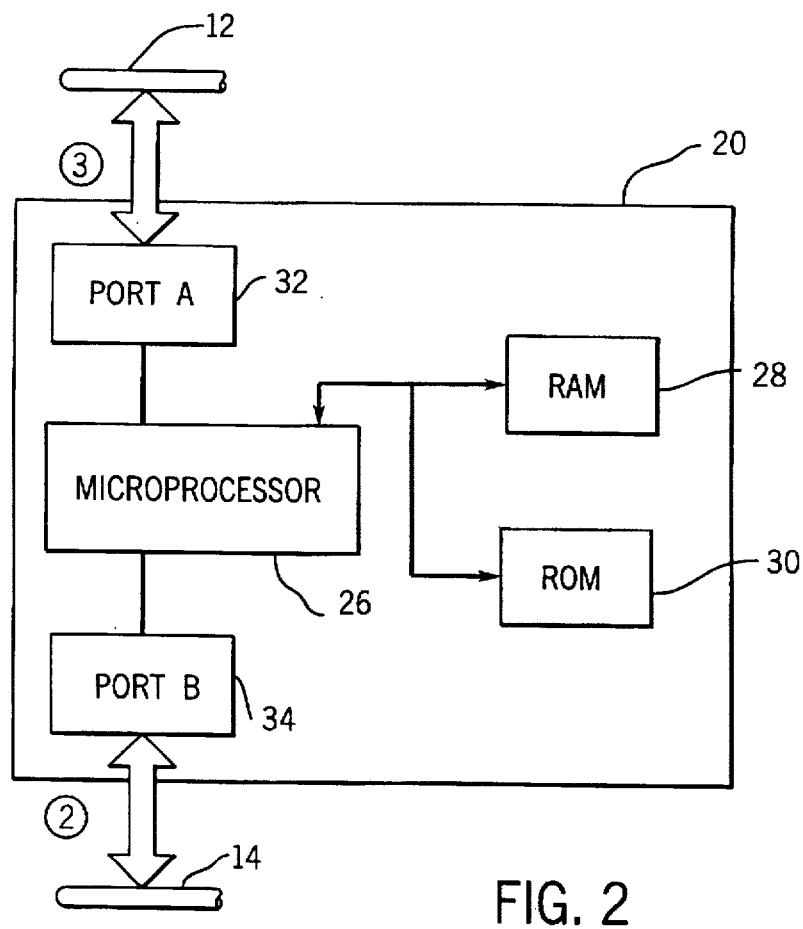
FIG. 2 is a block diagram of a representative node of FIG. 1 having a microprocessor with associated memory and a first and second port for communicating between the two links.

Referring now to FIG. 2, the bridge 20, as representative of a typical node, may have at least one microprocessor 26 communicating with random access memory (RAM) 28 and nonvolatile read only memory (ROM) 30. Generally, the RAM 28 is used for temporary storage of message data received by the bridge 20 (buffer memory) and for the storage of variables. In the more general case where the node is not simply a bridge but provides I/O points and remote processing, the RAM 28 will also hold, for example, an image table reflecting the values of the inputs and outputs at any given time, as well as other variables needed during the control process.

The ROM 30 holds a stored program executed by the microprocessor 26 to provide communication functions as will be described and, in the more general case where the node is not simply a bridge, may also provide a stored program controlling local inputs and outputs.

Microprocessor 26 also communicates with port circuitry 32 and 34 providing ports A and B respectively, and handling low level control of the receipt and transmission of data on links 12 and 14 such as generally known in the art. Such low level control may include, for example, the conversion of parallel data received from the microprocessor 26 to a format compatible with the link 12 or 14 and at the correct Baud rate, as well as arbitration to determine whether the node of bridge 20 has permission to transmit information. Ports 32 and 34 also provide some decoding functions which filter messages on the links 12 and 14 relying to the microprocessor 26 only those message addressed to the bridge 20. As is known in the art, the microprocessor includes clock circuitry (not shown) to enable it to perform timing functions needed for the scheduling of message data to be described.

Referring now to FIGS. 1 and 2, an example communication of a message on the network 10 may involve a communication between the PLC 16 and the remote I/O 22, for example, to set certain remote, binary outputs on or off or to send analog data. This communication will require the PLC 16 to send a data message on its port A through link 12 to the bridge 20. The bridge 20 must then convey the data message via its port B to link 14 to the remote I/O 22. The PLC 16 in this case will be the originator node, the bridge 20 will be an intermediate node and the remote I/O 22 will be a consumer node.

As described above, each node attached to either link 12 and 14 has a link address, which together with the port designation of A or B uniquely identifies a network connection path. Generally, the link addresses need not be consecutive or have any relationship to the physical location of the nodes on the link 12. Note too that the link addresses between different links 12 and 14 may not be unique. In this example, port B of the bridge 20 has the same link address as port A of the I/O 18.

In order to establish communication between the PLC 16 as originator and the remote I/O 22 as a consumer, information must be conveyed to the bridge 20 indicating how the information is to be processed in its routing between links 12 and 14. This information depends on the specific implementation of the communication network and what kind of links 12 and 14 are used but will generally include how much memory must be available in the intermediate node to temporarily store the message data prior to its retransmission to the consumer node (buffer space) the connection identifier of the retransmission (as will be described), and the required schedule of the retransmission.

In order that no message on the links 12 and 14 be delayed by an unacceptable amount by prior length messages, all messages are broken up into packets of data that are interleaved on the links 12 and 14 in time division multiplexing known in the art. As a result, short critical messages will not be unduly delayed. Each packet, however, requires that the intermediate nodes have the above described information on how the packet is to processed in its routing between links 12 and 14. In the present invention, to avoid the redundant transmission of the routing information with each packet, the packets of each message are transmitted between the PLC 16 and the remote I/O 22 in a two step process. The first step involves the sending of a single OPEN message by the originating node, in this case the PLC 16, which preconfigures the nodes but which does not transmit message data. The second step involves sending multiple packets which hold the data of the message, but which do not carry configuration data for the nodes.

Referring now to FIGS. 1 and 4, as noted above, the OPEN message carries with it information characterizing the message to be transmitted (e.g., its size and rate) and providing information about the path of the message (the originating, consuming and intermediate nodes). The path of the connection is contained in path data 38 which consists generally of a list of ports (A, B, C . . . ) and link addresses necessary to trace a path from the originator to the consumer. In the case where the PLC 16 is the originator and the remote I/O 22 is the consumer, the path information would consist of the list:

A.3.B.30

Thus, the message must be transmitted out of port A of the PLC 16, received by address 3 (the bridge 20 on link 12) transmitted out of port B of the bridge 20 and received by address 30 on link 14. The list of the path may be arbitrarily long and requires that the originating node have information concerning the connections of those nodes through which the message will be transmitted. Such information is generally entered by the operator prior to configuration of the network.

A second piece of information in the OPEN message 36 may be a connection identifier (CID) 40 which is used to uniquely identify subsequent message to the configuration information, as will be described, of the OPEN message 36. Alternatively, the CID 40 may be chosen by the node receiving the OPEN message 36 and transmitted to the producer of the message packets by OPEN reply message (not shown). In either case, the CID 40 for a given message between two nodes is unique for a given link 12 or 14. The CID generating node may maintain a list of its connection identifiers in use, so as to re-use them keeping their range small.

For links 12 or 14 which permit allocation of portions of their bandwidth to particular messages, the OPEN message 36 will also contain rate data 42. Rate data allows the scheduling of packets to insure a given packet transmission rate and thus to improve the determinism of the control process. Although the present invention admits to a variety of different scheduling mechanisms, in one example, the total link bandwidth is divided into periodic interval times (PITs) during which each node may send one scheduled packet (defined by a fixed number of bytes) and an indeterminate number of unscheduled packets. The rate data 42 therefore describes how rapidly the packets will be transmitted in terms of PITs. All the rates must be binary multiples of the PIT and hence the rate may be one packet every $2^N$ PIT's where N is an integer. The number of bytes of scheduled packet data that may be transmitted during a PIT is defined by a preprogrammed attribute of the node and held in ROM 30. For the bridge 20 of this example, the byte limit is 100 bytes. The rate data 42 is used by the bridge 20 for scheduling of the retransmission of the packets to the remote I/O 22 as will be described below.

Generally, links 12 or 14 permitting bandwidth allocation will allow one or more priorities of messages. In this case, also contained in the OPEN message 36 is priority information indicating the relative priority of the packet data to be received as part of the message. Generally three types of priority may be recognized: scheduled messages (indicating that the message should be sent using that part of the link bandwidth allocated to scheduled messages, or in the above example, that the packet should be transmitted during the scheduled portion of the PIT), and unscheduled messages. The unscheduled messages may be divided into high and low priorities where high priority data is sent before low priority data on an unscheduled basis.

Scheduled priority provides a high degree of determinism of the transmission of the message. Scheduled priority data is guaranteed to arrive as scheduled regardless of network traffic. Generally, however, scheduled data will not arrive before high priority data but only more predictably than high priority data.

Three additional pieces of information contained in the OPEN message 36 are: buffer size 46, time-out value 48 and packet type 50. Buffer size indicates the size of each packet and is used by the receiving node to allocate sufficient amount of memory 28 (shown in FIG. 2) to temporarily store the packet prior to retransmission. Buffer size data 46 is critical because if insufficient buffer is available in a particular node, new incoming packets will write over the memory of the last packet, possibly of a different message, causing a data loss unacceptable in a deterministic industrial control system.

The time-out value 48 provides a period of time after which the message is presumed to have ended so that its node resources can be reallocated to other messages. The time-out value is generally set equal to four times the packet rate data 42 so as to insure the time-out does not occur while packet information is still being transmitted. The time-out value insures that the unused buffer of the node is free to be used for new messages.

The type information 50 generally indicates whether the message is being sent to more than one receiving node as in a multicast transmission or whether it is point-to-point.

Thus, the OPEN message 36 contains transmission information related to the processing of a message by intervening nodes. Generally absent from the OPEN message 36, however, is any actual message data such as, for example, the state of a given output or input. Referring now to FIG. 5, the actual message data is contained in a number of data packets 52 following the OPEN message 36. Generally each data packet 52 includes a header having the connection identifier 40 followed by the data portion 54. Importantly, the data portion 54 of the data packet 52 represents the principal part of the data packet 52 allowing extremely efficient transmission of data in the subsequent data packets 52 as will now be described.

Figure 11:
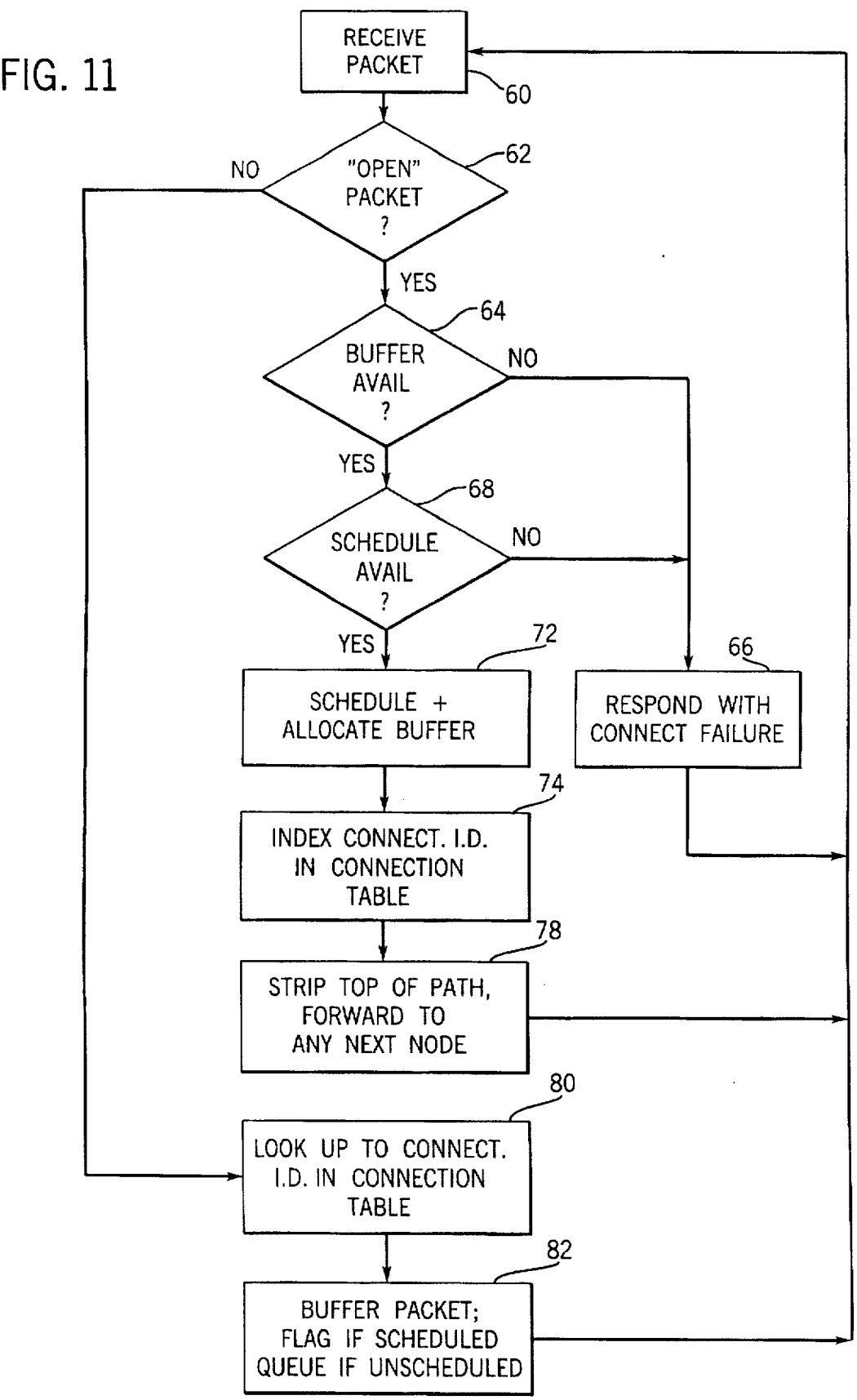
FIG. 11 is a flow chart showing the steps undertaken by the node of FIG. 2 in processing message data received on the links of FIG. 1.

Referring now to FIGS. 1, 2 and 11, the bridge 20 attached to the remote link 14 will review messages received by its port 32 or 34 according to a standard protocol held in a stored program in ROM 30 and executed by microprocessor 26 and now described. At a first step in this program, represented by process block 60, a received message directed to a port and link address of the bridge 20 will be decoded by the port circuitry 32 or 34 and transmitted to the microprocessor 26. At decision block 62, the type of message, either as a OPEN message 36 or a data packet 52 will be determined. This determination can be done by using an unique CID for OPEN messages 36.

If the message received is an OPEN message 36, (as shown in FIG. 4) the buffer size data 46 is examined to see if sufficient memory 28 is available to buffer the message associated with the OPEN message 36. This decision, as indicated by decision block 64, involves comparing a buffer pointer, indicating the end of an allocated buffer, to the total amount of memory available for buffering messages in the bridge 20. If insufficient memory is available for buffering the message, then the connection requested by the OPEN message 36 cannot be made and the program branches to process block 66 and the bridge 20 responds to the originating PLC 16 with a connection failure message.

Significantly then, the originating node has a positive confirmation that a reliable connection cannot be made and steps can be taken to physically reallocate the network resources or rewrite the control program to resolve the problem. Significantly too, this confirmation occurs before data is lost. An important effect of the consignation of the OPEN message 36 and the connection failure response is that network congestion, where a given node cannot adequately buffer the packets is received, is avoided before the fact. Communication networks that control congestion by rejecting messages as they are sent or by informing the transmitting nodes of the congestion, risk unpredictable message delay or loss.

If at decision block 64, sufficient buffer is available for receiving the packets related to the OPEN message 36, then the program proceeds to decision block 68 to see if the packets of the message need to be scheduled per the priority data 44 and if so, whether the rate of scheduling per rate data 42 may be accommodated given the other messages also handled by the bridge 20.

Figure 6:
FIG. 6 is a scheduling table used by the microprocessor of FIG. 2, stored in the memory of FIG. 2 and used to determine the frequency of retransmission of the message data of FIG. 5 according to the schedule contained in its OPEN message of FIG. 4.
Figure 7:
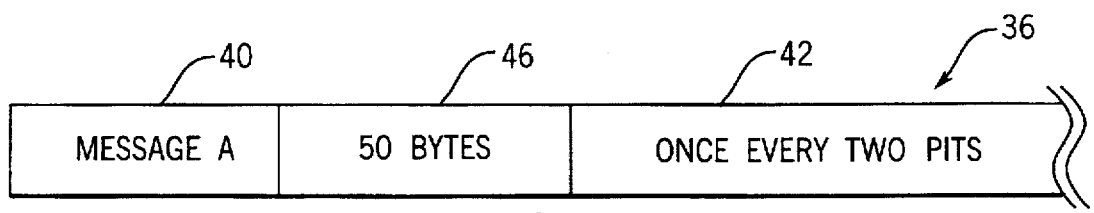
FIGS. 7–10 are examples of four OPEN messages for different messages such as are scheduled in the scheduling table of FIG. 6.

Referring now to FIG. 6, in one example, this scheduling in question can be resolved by referring to a scheduling table 70 held in RAM 28 of the bridge 20. The scheduling table 70 is stored as a matrix according to computer techniques well known in the art and includes matrix columns each representing one of a predetermined number of PITs, the link transmission slots described above. Generally, the number of PITs in the scheduling table 70 will depend on the range of scheduling rates allowed and will be determined by the lowest scheduling rate. That is, if a scheduling rate of a packet transmission in one PIT for every 8 PITs is allowed, 8 PIT columns will be required in the scheduling table 70.

Within each column representing a PIT, the particular messages identified by their CIDs 40 and indicated in FIG. 6 (for notational convenience) as letters A through D are provided. Thus, during PIT number 0, packets A and C are scheduled.

Also within each column representing a PIT are the total bytes to be transmitted, equalling the sum of the bytes represented by the scheduled packets as determined by the buffer size data 46 of the OPEN message associated with those packets. Also tabulated for each column representing a PIT is the number of open bytes not yet allocated to scheduled transmissions as determined by the difference between the scheduled bytes and the maximum number of scheduled bytes allocated to that node as described before.

Figure 8:
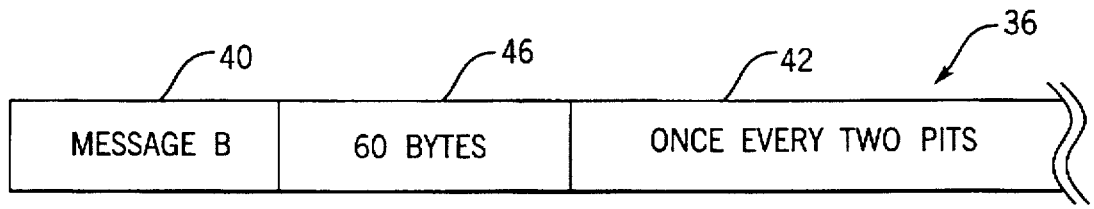

In the example of FIG. 6, four different messages each having CIDs A–D as shown in FIGS. 7 through 10 have been scheduled. The first message A, indicated by the OPEN message 36 of FIG. 7, includes a buffer (packet) size 46 of fifty bytes and a rate, per rate data 42, of once every two PITs. Thus, packets from message A are scheduled at PIT numbers 0, 2, 4 and 6 in the scheduling table 70. Message B, indicated by OPEN message of FIG. 8, is scheduled for a rate, per rate data 42, of once every two PITs as is message A and includes sixty bytes per packet. B is thus scheduled for PIT numbers 1, 3, 5 and 7 in the scheduling table. Note that message B could not be scheduled for the same PIT numbers as message A without violating the byte limit for the bridge of one-hundred bytes.

Figure 9:
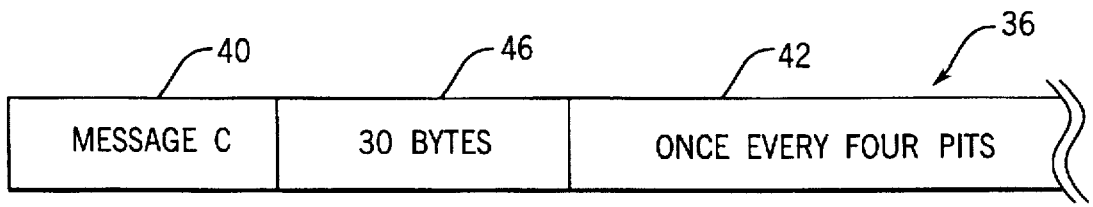
Figure 10:
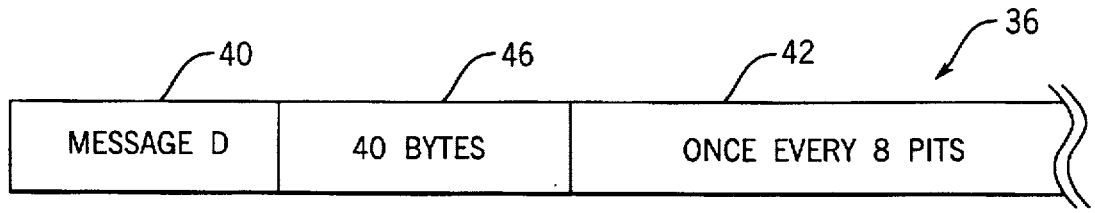

Message C, defined by the OPEN message 36 of FIG. 9, requires a different rate of once every four PITs and its thirty bytes are thus allocated to PIT numbers 0 and 4 only. Likewise message D, defined by the OPEN message 36 of FIG. 10, requires the lowest rate of once every 8 PITs and its 40 bytes are thus allocated to PIT number 1 only.

With the scheduling table 70 so filled, if a new OPEN message 36 were to be received having thirty bytes in each packet and a rate of once every two PITs, this OPEN message would be rejected at decision block 68 based on a lack of available schedule space. On the other hand, a message having a packet size of thirty bytes and a repetition rate of once every four PITs could be accommodated.

Generally, there will not be a unique scheduling and the program of process block 72 following process block 68 will place the packets in the scheduling table 70 according to the order that they are received. Thus, the possibility exists under this system that less than optimal scheduling will be obtained. It will be apparent however, to those of ordinary skill in the art that more complex scheduling programs may be adopted, if hardware permits, to provide for a reevaluation of the scheduling as new OPEN messages are received.

Referring again to FIG. 11, if at decision block 68 schedule space is not available, the program branches again to process block 66 and a message indicating that a connection cannot be established is returned to the originating node of PLC 16 so that there is no ambiguity as to whether packets may be transmitted.

Assuming at decision block 64 and 68 that buffer space is available in RAM 28 and that a schedule is available in the scheduling table 70, then the buffer space is in fact allocated in the scheduling table 70 and adjusted to reflect the future transmission of the packets associated with the OPEN message received at process block 72.

Referring also to FIG. 3, once the scheduling table 70 has been updated with the information of the OPEN message, per process block 74, a connection table 76 is modified linking the CID 40 of the OPEN message to the parts of the transmission information of the OPEN message required for the processing of the packets of the message by the bridge 20. The connection table 76 also stored as a matrix in RAM 28 (shown in FIG. 2) and has in its first index column the CID 40 of each OPEN message that has been accepted by the bridge 20. These CIDs are sorted in numeric order so as to permit rapid access to the information in the row of the connection table 76 associated with any CID 40.

In each row of the connection table linked to the CID 40 is information on the starting and ending address of a buffer in RAM 28 used for storing the packets of the message of the CID 40. Thus, once the CID 40 of a packet is identified, the data portion 54 of the message may be rapidly stored in the buffer without the need to find and open a buffer for that particular packet.

Also linked by the connection table 76 to the CID 40 will be a second CID 40' suitable for the retransmission. this CID 40 may be simply appended on the data packet 52 with that retransmission.

Thus, as will be described further below, when a data packet 52 is received, the CID 40 of that data packet may be used to rapidly process the data packet 52 without the processing overhead associated with processing each packet wholly after the time of its receipt.

After process block 74, where the CID 40 is added to the connection table 76 together with the other data required for the routing of packets, the program proceeds to process block 78 and the OPEN message 36 of FIG. 4 is retransmitted to the next node, the remote I/O 22, indicated by the path data 38 in the OPEN message 36 with the path data 38 modified to delete that information referring to the current node, the bridge 20. Thus, the OPEN message follows the path that will be followed by subsequent data packets 52 informing each node so that it may prepare to rapidly process the oncoming packets with a minimum amount of further preparation.

If a packet received by the node of bridge 20 is not an OPEN message 36 but a data packet 52, then at decision block 64, the program proceeds to process block 80 and the CID 40 appended to the front of the data portion 54 of the data packet 52 is looked up in the connection table 76 to obtain the necessary transmission information for the further processing of the packet. At process block 82, the incoming data is buffered and if the message is scheduled, as can be indicated by information stored in the connection table 76, a flag is set so that the scheduling of retransmission of the packet per scheduling table 70 can be performed. If the message is unscheduled, the message can be put in a queue to await an unscheduled data transmission.

The scheduling program (not shown) may run as a background task under interrupt control as is understood in the art, and follows the scheduling table 70 to retransmit the packet retransmitted with the CID 40' is appended to the data and it is transmitted to the next node. Generally, for the final or consumer node, the data is not retransmitted externally but a similar procedure can be used within the program of the consuming node to pass the data to a desired application running within that node. Thus the same procedure as described may be used not merely for the transmission over a physical link but for the transmission of data within a program through layers of applications.

The above description has been that of a preferred embodiment of the present invention. It will occur to those that practice the art that many modifications may be made without departing from the spirit and scope of the invention. For example, the methods described can be used with an arbitrarily complex network of nodes and links to provide rapid bi-directional communication. In order to apprise the public of the various embodiments that may fall within the scope of the invention, the following claims are made.

We claim:

1. A method of real-time communication for an industrial control system having a spatially separated transmitting and receiving node together forming a path connected by at least one communication link, the method comprising the steps of:

(a) generating a message identifier identifying a message to be transmitted to the receiving node;

(b) sending an OPEN message from the transmitting node to the receiving node including the message identifier and transmission information related to transmission requirements of the message;

(c) storing in a table in the receiving node the message identifier and the transmission information as indexed by the message identifier;

(d) pre-allocating receiver node resources for the processing of the message according to the transmission information by the receiving node;

(e) sending a data message from the transmitting node to the receiving node, the data message having a data part and the message identifier;

(f) matching the message identifier of the data message to the message identifier of the table of the receiving node; and (g) processing the data message at the receiving node according to the transmission information indexed by the message identifier wherein the receiving node maintains a transmission schedule of messages to be transmitted and wherein the transmission information is the desired transmission scheduling of a retransmission of the data message by the receiving node and wherein the step (d) includes scheduling the data message on the schedule wherein the desired transmission scheduling of a retransmission indicates a size of a portion of the message and a periodicity of transmission of the portion in time.

* * * * *